Nov. 8, 1960    R. E. DOERFER ET AL    2,959,073
SHAFT RETAINER FOR EPICYCLIC GEARING AND THE LIKE
Filed March 31, 1958

*INVENTORS*
R. E. DOERFER & V. L. RUGEN ns # United States Patent Office 2,959,073
Patented Nov. 8, 1960

2,959,073

SHAFT RETAINER FOR EPICYCLIC GEARING AND THE LIKE

Richard E. Doerfer, Waterloo, and Vernon L. Rugen, Cedar Falls, Iowa, assignors, by mesne assignments, to Deere & Company, a corporation of Delaware Filed Mar. 31, 1958, Ser. No. 725,101

4 Claims. (Cl. 74—801)

This invention relates to a shaft retainer or the like which finds particular utility in epicyclic gearing as means for retaining the planet pinion shafts against both axial and undesirable angular movement.

It is a general object of the invention to provide an improved retainer assembly of the character indicated. It is a particular object to utilize a split snap ring in association with a hub groove and which has peripheral portions engaging cooperative grooves in a plurality of pinion shafts spaced angularly about the axis of the hub. A further object is to shape the shafts so that because of engagement thereof with the snap ring, they are prevented from turning through undesirable amounts about their own respective axes. It is a further object to shape and dimension the shaft grooves so as to permit radial expansion of the snap ring for assembly and disassembly. On the whole, the invention provides an improved and inexpensive retainer of the character indicated.

The foregoing and other important objects and desirable features inherent in and encompassed by the invention will become apparent as a preferred embodiment thereof is disclosed, by way of example, in the ensuing specification and accompanying sheet of drawings, the figures of which are described below.

The epicyclic gearing comprises a sun gear 10, a carrier 12 and a plurality of planet pinions 14 typically in mesh with and angularly spaced about the sun gear 10.

Figure 2:
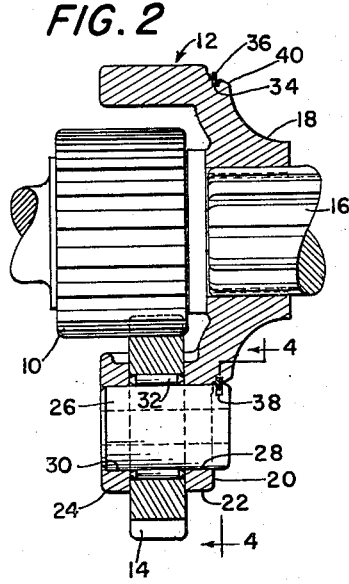
Fig. 2 is a section on the line 2—2 of Fig. 1.
Figure 3:
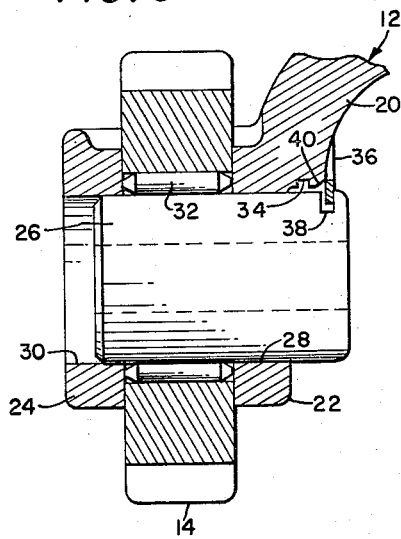
Fig. 3 is an enlarged fragmentary section showing one stage of the assembly or disassembly of the structure.

The carrier or support 12 is itself carried on a shaft 16 which is coaxial with the sun gear 10 and has a hub 18 and a plurality of radial support portions 20. Each support portion is bifurcated and therefore has a pair of ears 22 and 24. In the interests of clarity, the structure will be assumed to have a front end, which is toward the right as seen in Figs. 2 and 3. The rear end or side is of course in the opposite direction. Consequently, the ears 22 and 24 are front and rear ears. The ears 22 are coplanar in a radial plane and normally respectively carry fore-and-aft pinion shafts 26. For that purpose, each pair of ears is provided with coaxial openings 28 and 30, respectively.

Each pinion 14 has a central opening, here afforded by an annular row of roller bearings 32 which journal the pinion on the associated shaft 26. As will be seen, the ears 22 and 24 of each support portion 20 straddle the associated pinion and the pinion is journaled as already described.

Figure 4:
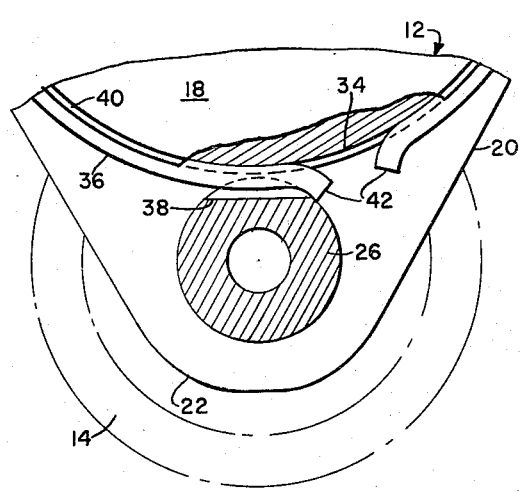
Fig. 4 is an enlarged fragmentary section as seen generally along the line 4—4 of Fig. 2, with the ring turned slightly out of its Fig. 1 position.

The hub 18 is provided with a concentric, annular, radially outwardly opening groove 34 which lies just ahead of the front face of the coplanar support ears 22. This groove normally carries a split ring 36, and the front end of each pinion shaft 26 has therein a groove 38 which is normally in radial register with and opens radially inwardly toward the hub groove 34 so as to receive the proximate peripheral portion of the ring 36. As best seen in Fig. 4, each shaft 26 is cylindrical and the shape of the groove 38 is such that it is chordal on the cylinder. In that view, and in Fig. 3, it will be seen that the depth of the shaft groove 38 is greater than the radial thickness of the proximate portion of the snap ring 36. The ring is of the type that is biased to contract in the hub groove 34, but it is forcibly expandable into the increased depths of the shaft grooves 38 to an inside diameter sufficient to clear the hub groove 34, whereby the ring, together with the pinion shafts 26, may be axially separated from the carrier by forward movement thereof away from the carrier. A portion of the hub forwardly of and bordering the hub groove 34 is chamfered at 40, to facilitate expansion of the ring 36 in assembly.

Figure 1:
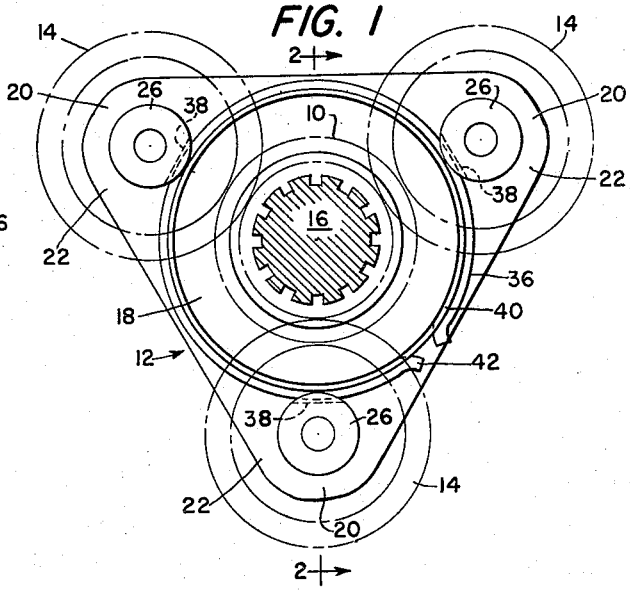
Fig. 1 is a front end view, partly in section, of a typical epicyclic gearing arrangement.

As best shown in Figs. 1 and 4, the opposite ends of the split ring are turned outwardly at 42 a radial distance greater than the depth of the shaft grooves 38 so that the tendency of the ring to rotate relative to the hub is limited to an angular amount determined by engagement of the projections 42 with one or the other of the shafts 26 between which the end portions are initially located.

Figs. 1, 2 and 4 show the assembled relationship of the components. Fig. 3 may be taken as representative of a preliminary stage in assembly or a later stage in disassembly. Considering the structure from the standpoint of disassembly, it will be noted from a comparison of Figs. 2 and 3 that in Fig. 3 the snap ring 36 is still in the shaft groove 38 but is out of the hub groove 34. This has been accomplished by expanding the snap ring 36 in its Fig. 2 status so that it is accommodated by the increased depth of the shaft grooves 38. This relationship, as previously described, accommodates the full radial thickness of the ring 36 so that it clears the hub groove 34. Consequently, the ring 36 may be shifted axially forwardly and the pinion shafts 26, since they are still connected to the ring, will also move axially forwardly. The gap between the ring end portions 42 is sufficient to enable forcible contraction of the ring once it has passed the chamfer 40 and it may thereby be freed from the pinion shafts, after which the shafts may be removed individually as desired. As also best shown in Fig. 3 it will be seen that the condition of the shafts and ring 36 when the latter clears the hub groove 34 is such that the ring may be separated from the shafts, but the shafts still bridge the support portion ears 22 and 24 by an amount sufficient to retain the associated pinion 14. Therefore, it is not necessary to pull all pinion shafts simultaneously; although, this can be done if desired.

As stated above, Fig. 3 may be taken as representative of a preliminary stage in assembly. If so, then it will be seen that the bridging condition of the shaft 26 between the support portion ears 22 and 24 is such that the pinion 14 is retained in place as against radial displacement. The pinion shafts 26 have been rearwardly introduced to a point sufficient to dispose the shaft grooves 38 just ahead of the chamber 40, at which point the snap ring 36 is received by the shaft grooves. The subassembly comprising the ring and shafts 26 is then shifted rearwardly, the chamber 40 serving as means whereby the ring may be forcibly expanded so that ultimately it will be received by the hub groove 34 into which it is biased to contract. At that time, the shafts 26 will be in their full rearward positions as shown in Fig. 2.

Because of the chordal nature of the shaft grooves 38, each shaft may have only limited rocking relative to the carrier 12, which is of significance in epicyclic gearing. Likewise, the ring projections 42 prevent more than a limited amount of turning of the ring 36 on the hub 18.

Assembly and disassembly may be effected with conventional tools. The ring 36 serves the dual function of retaining the pinion shafts 26 against axial displacement as well as limiting angular movement thereof about their own axes. Details other than those categorically enumerated will readily occur to those versed in the art, as will many modifications and alterations in the preferred embodiment disclosed, all of which may be achieved without departure from the spirit and scope of the invention.

What is claimed is:

1. In combination: a support including a hub and a plurality of radially coplanar portions extending radially outwardly from said hub, said hub having a terminal circular end ahead of the plane of said portions and further having therein, intermediate said plane and said end, an annular radially outwardly opening groove, and said portions respectively having cylindrical openings therein on axes parallel to the hub axis and lying on a concentric circle radially outwardly of the outside diameter of the hub; a plurality of cylindrical members equal in number to and proportioned to respectively fit the openings for both axial and turning movement in said openings when unrestricted, each member having a forward end provided with a groove transverse to the member axis and said members being initially insertable rearwardly into the respective openings with their grooves facing radially inwardly and having their bottoms tangent to a concentric circle in a radial plane ahead of the hub end; and a resilient split ring concentric with the hub and initially received in the member grooves, said ring having a normal outside diameter less than the circle tangent to the bottoms of said member grooves and a normal inside diameter substantially equal to the diameter of the bottom of the hub groove, said ring being capable of temporary radial expansion into the member grooves to temporarily increase its inside diameter sufficiently to pass axially rearwardly over the hub end while the members are moved rearwardly at the same time until said ring radially registers with and contracts to normal into said hub groove while still retaining engagement with the member grooves so as to hold the members and support against relative axial displacement, and said ring being radially expansible out of the hub groove and into the member grooves to enable it to be moved forwardly with the members for withdrawing the members from said openings, and the bottoms of said member grooves and proximate peripheral portions of the ring being so shaped as to operate to hold the members against rotation about their respective axes.

2. In combination: a support including a hub and a plurality of radially coplanar portions extending radially outwardly from said hub, said hub having a terminal circular end ahead of the plane of said portions and further having therein, intermediate said plane and said end, an annular radially outwardly opening groove, and said portions respectively having openings therein on axes parallel to the hub axis and lying on a concentric circle radially outwardly of the outside diameter of the hub; a plurality of members equal in number to and proportioned to respectively fit the openings for axial movement in said openings when unrestricted, each member having a forward end provided with a groove transverse to the member axis and said members being initially insertable rearwardly into the respective openings with their grooves facing radially inwardly and having their bottoms tangent to a concentric circle in a radial plane ahead of the hub end; and a resilient split ring concentric with the hub and initially received in the member grooves, said ring having a normal outside diameter less than the circle tangent to the bottoms of said member grooves and a normal inside diameter substantially equal to the diameter of the bottom of the hub groove, said ring being capable of temporary radial expansion into the member grooves to temporarily increase its inside diameter sufficiently to pass axially rearwardly over the hub end while the members are moved rearwardly at the same time until said ring radially registers with and contracts to normal into said hub groove while still retaining engagement with the member grooves so as to hold the members and support against relative axial displacement, and said ring being radially expansible out of the hub groove and into the member grooves to enable it to be moved forwardly with the members for withdrawing the members from said openings.

3. The invention defined in claim 2, in which: the hub end has thereon an annular chamfer providing an annular ramp leading rearwardly and radially outwardly from an annular front portion of a diameter less than the normal inside diameter of the ring whereby to facilitate expansion of the ring as it is moved rearwardly over said hub end.

4. The invention defined in claim 2, in which: at least one of the terminal ends of the split ring projects radially outwardly beyond the depth of the member grooves so as to be capable, when turned angularly about its own axis relative to the hub, to engage a member and thereby to limit said turning of the ring relative to the hub.

References Cited in the file of this patent
UNITED STATES PATENTS

| | | |
|---|---|---|
| 1,948,475 | Newmann | Feb. 20, 1934 |
| 2,498,295 | Peterson et al. | Feb. 21, 1950 |
| 2,886,355 | Wurzel | May 12, 1959 |

FOREIGN PATENTS

| | | |
|---|---|---|
| 747,133 | Great Britain | Mar. 26, 1956 |